US012524391B2

(12) United States Patent
Shinde et al.

(10) Patent No.: US 12,524,391 B2
(45) Date of Patent: Jan. 13, 2026

(54) SYSTEMS AND METHODS FOR DATA GOVERNANCE AS A SERVICE

(71) Applicant: Capital One Services, LLC, McLean, VA (US)

(72) Inventors: Ajay Shinde, Glen Allen, VA (US); Sindhu Myla, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/427,267

(22) Filed: Jan. 30, 2024

(65) Prior Publication Data

US 2024/0256521 A1 Aug. 1, 2024

Related U.S. Application Data

(60) Provisional application No. 63/482,464, filed on Jan. 31, 2023.

(51) Int. Cl.
*G06F 7/00* (2006.01)
*G06F 16/23* (2019.01)

(52) U.S. Cl.
CPC ............................... *G06F 16/2365* (2019.01)

(58) Field of Classification Search
CPC .................................................. G06F 16/2365
See application file for complete search history.

(56) References Cited

U.S. PATENT DOCUMENTS

| 5,778,370 | A  | * | 7/1998 | Emerson | G06F 16/21 |
| 7,991,747 | B1 | * | 8/2011 | Upadhyay | H04L 63/20 707/821 |
| 7,996,374 | B1 | * | 8/2011 | Jones | H04L 63/20 707/694 |
| 9,594,546 | B1 | * | 3/2017 | Todd | H04L 67/1097 |
| 2010/0107244 | A1 | * | 4/2010 | Li | G06F 21/577 726/22 |
| 2013/0030850 | A1 | * | 1/2013 | Marrelli | G06Q 10/00 705/7.11 |
| 2015/0293834 | A1 | * | 10/2015 | Potdar | G06F 8/30 717/131 |
| 2015/0356095 | A1 | * | 12/2015 | Davis Jones | G06F 16/122 707/694 |
| 2016/0306827 | A1 | * | 10/2016 | Dos Santos | G06F 16/25 |
| 2017/0300706 | A1 | * | 10/2017 | Jassal | G06F 21/6218 |
| 2018/0191730 | A1 | * | 7/2018 | Deters | G06F 21/552 |
| 2018/0293400 | A1 | * | 10/2018 | Borup | G06F 21/554 |
| 2019/0327271 | A1 | * | 10/2019 | Saxena | G06F 8/38 |

(Continued)

*Primary Examiner* — Mohammed R Uddin
(74) *Attorney, Agent, or Firm* — Bookoff McAndrews, PLLC

(57) ABSTRACT

Systems and methods for performing data governance as a service is disclosed and may include onboarding a database to a governance as a service system, the database including at least one data set, executing, via the data governance as a service system, at least one core capability, wherein the at least one core capability is applicable to the at least one data set, determining data governance metadata for the at least one data set, wherein the data governance metadata is a subset of a data set metadata, applying at least one policy rule of the core capability to the data governance metadata, determining a violation based on applying the at least one policy rule, generating a first alert based on the violation, and transmitting the first alert to a designated system.

20 Claims, 12 Drawing Sheets

(56) References Cited

U.S. PATENT DOCUMENTS

| | | | | |
|---|---|---|---|---|
| 2020/0019558 | A1* | 1/2020 | Okorafor | G06F 21/6254 |
| 2020/0265356 | A1* | 8/2020 | Lee | G06Q 10/0635 |
| 2020/0311627 | A1* | 10/2020 | Marcos | G06F 21/6218 |
| 2021/0192389 | A1* | 6/2021 | Guan | G06F 16/215 |
| 2021/0357963 | A1* | 11/2021 | Loginov | G06F 16/284 |
| 2022/0027380 | A1* | 1/2022 | Martin | G06Q 40/08 |
| 2022/0237309 | A1* | 7/2022 | Reineke | G06F 21/6245 |
| 2022/0300497 | A1* | 9/2022 | Pansare | G06N 20/00 |
| 2022/0398184 | A1* | 12/2022 | Bhide | G06F 11/3692 |
| 2022/0398337 | A1* | 12/2022 | Franquin | G06F 16/24564 |
| 2023/0128589 | A1* | 4/2023 | Joseph | G06F 16/93 704/9 |
| 2023/0418980 | A1* | 12/2023 | Abrougui | G06F 16/215 |
| 2024/0020291 | A1* | 1/2024 | Nogles, Jr. | G06F 16/2365 |
| 2024/0062232 | A1* | 2/2024 | Loginov | G06F 16/284 |

* cited by examiner

1. TICK-BOX APPROACH FOR COMPLIANCE — 205
2. NOT UNDERSTANDING THE DATA LANDSCAPE — 210
3. NO RIGHT OWNERSHIP AND LEAD BY SILO INITIATIVES — 215
4. NOT UNDERSTANDING THE MATURITY OF THE ORGANIZATION — 220
5. FAILURE TO EMBED THE FRAMEWORK — 225
6. DATA GOVERNANCE AS A PROJECT — 230
7. MISALIGNMENT WITH STRATEGY — 235
8. ATTEMPTING THE BIG BANG APPROACH — 240
9. THINKING A TOOL IS THE ANSWER — 245

FIG. 2

SYSTEMS AND METHODS FOR DATA GOVERNANCE AS A SERVICE

CROSS-REFERENCE TO RELATED APPLICATIONS

This application claims the benefit of U.S. Provisional Patent Application 63/482,464, filed Jan. 31, 2023, the entire contents of which are incorporated herein by reference.

TECHNICAL FIELD

Various embodiments of the present disclosure relate generally to data governance as a service and more specifically to using trained machine learning models to implement data governance as a service.

INTRODUCTION

Data governance is a collection of processes, roles, policies, standards, and metrics that ensure the effective and efficient use of information in enabling an organization to achieve its goals. Data governance policies may facilitate coherent data management across a given organization and/or across multiple organizations.

The introduction description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for data governance as a service.

In one aspect, an exemplary method for performing data governance as a service may include onboarding a database to a governance as a service system, the database including at least one data set; executing, via the data governance as a service system, at least one core capability, wherein the at least one core capability is applicable to the at least one data set; determining data governance metadata for the at least one data set, wherein the data governance metadata is a subset of a data set metadata; applying at least one policy rule of the core capability to the data governance metadata; determining a violation based on applying the at least one policy rule; generating a first alert based on the violation; and transmitting the first alert to a designated system.

In another aspect, an exemplary system may include at least one memory storing instructions, and at least one processor operatively connected to the at least one memory, and configured to execute the instructions to perform operations for data governance as a service. The operations may include onboarding a database to a governance as a service system, the database comprising at least one data set; executing, via the data governance as a service system, at least one core capability, wherein the at least one core capability is applicable to the at least one data set; determining data governance metadata for the at least one data set, wherein the data governance metadata is a subset of a data set metadata; applying at least one policy rule of the core capability to the data governance metadata; determining a violation based on applying the at least one policy rule; generating a first alert based on the violation; and transmitting the first alert to a designated system.

In another aspect, an exemplary non-transitory computer readable medium configured to store processor-readable instructions, wherein when executed by a processor, the instructions perform operations may include onboarding a database to a governance as a service system, the database comprising at least one data set; executing, via the data governance as a service system, at least one core capability, wherein the at least one core capability is applicable to the at least one data set; determining data governance metadata for the at least one data set, wherein the data governance metadata is a subset of a data set metadata; applying at least one policy rule of the core capability to the data governance metadata; determining a violation based on applying the at least one policy rule; generating a first alert based on the violation; and transmitting the first alert to a designated system.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 2 is a diagram that depicts drawbacks associated with traditional data governance, according to embodiments of the disclosure.

DETAILED DESCRIPTION OF EMBODIMENTS

Figure 1:
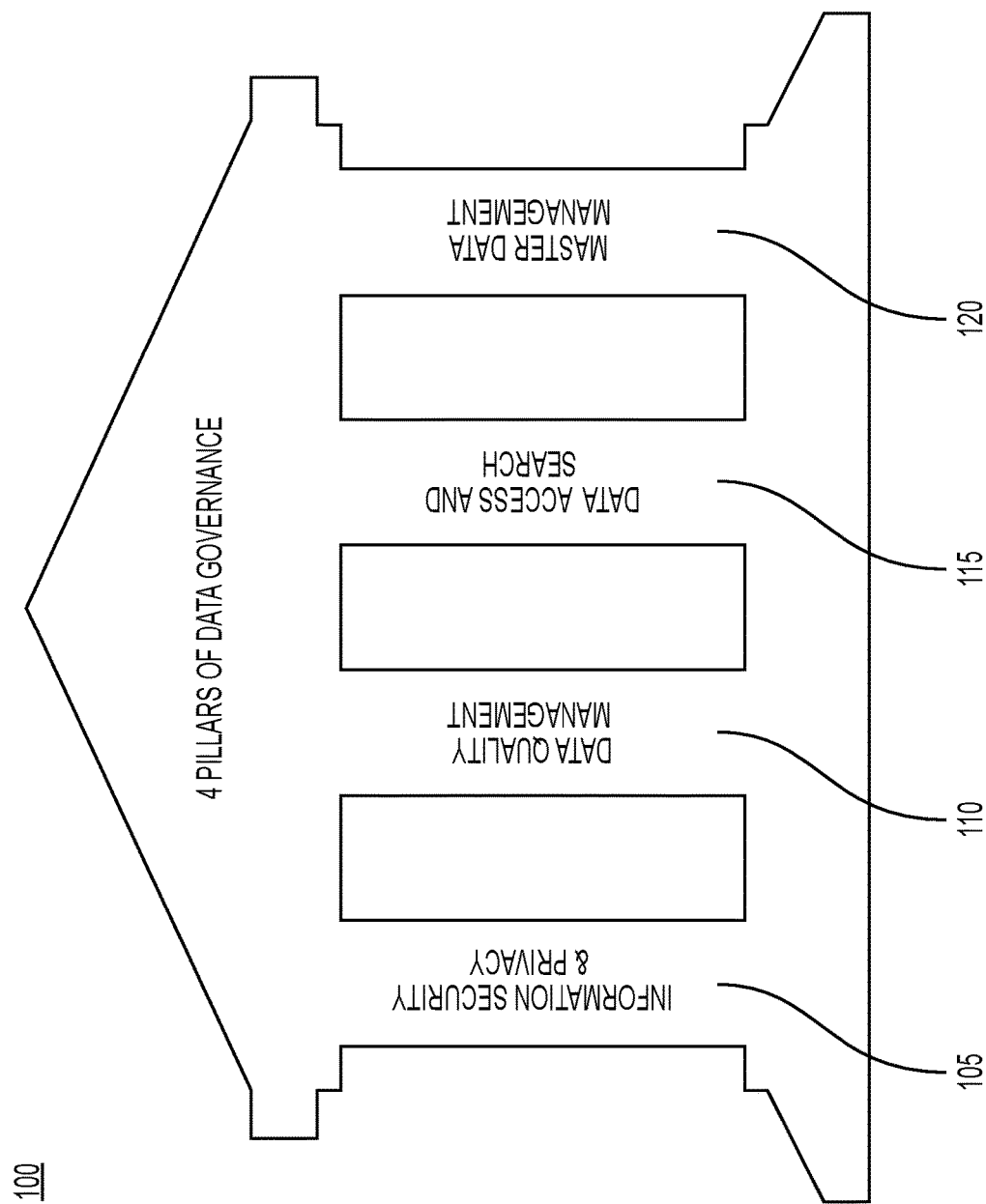
FIG. 1 is a diagram that depicts pillars of a data governance framework, according to embodiments of the disclosure.

Reference to any particular activity is provided in this disclosure only for convenience and not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Relative terms, such as, "substantially," "approximately," and "generally," are used to indicate a possible variation of ±10% of a stated or understood value.

As used herein, a "machine learning model" generally encompasses instructions, data, and/or a model configured to receive input, and apply one or more of a weight, bias, classification, or analysis on the input to generate an output. The output may include, for example, a classification of the input, an analysis based on the input, a design, process, prediction, or recommendation associated with the input, or any other suitable type of output. A machine learning model is generally trained using training data, e.g., experiential data and/or samples of input data, which are fed into the model in order to establish, tune, or modify one or more aspects of the model, e.g., the weights, biases, criteria for forming classifications or clusters, or the like. Aspects of a machine learning model may operate on an input linearly, in parallel, via a network (e.g., a neural network), or via any suitable configuration.

The execution of the machine learning model may include deployment of one or more machine learning techniques, such as linear regression, logistical regression, random forest, gradient boosted machine (GBM), deep learning, and/or a deep neural network. Supervised and/or unsupervised training may be employed. For example, supervised learning may include providing training data and labels corresponding to the training data, e.g., as ground truth. Unsupervised approaches may include clustering, classification or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc.

Data governance is a collection of processes, roles, policies, standards, and metrics that ensure the effective and efficient use of information in enabling an organization to achieve its goals. Data governance may not necessarily be limited to data management and/or master data management.

A governance solution, as disclosed herein, can be used to transition a non-intuitive data governance experience to a hyper-personalized, less cognitive, and intrinsic user experience by centralizing data governance as a Service (DGaaS). The Governance platform disclosed herein may work seamlessly with existing data management tools and help govern and mitigate data risk with people-centric, intuitive, and intelligent data governance with approximately 100% automation. The Governance platform may enable an entity to meet both well-managed and better-governed data needs at scale and support any newly added or existing data platforms.

Data management may refer to the management of the full data lifecycle needs of an organization. Data governance may be the core component of data management, tying together seven other disciplines, such as data quality, reference and master data management, data security, database operations, metadata management, and data warehousing.

Master data may refer to data with a standard definition that defines and describes core business entities. This data may be separate from reference data, which may refer to datasets that are used to classify or categorize other data (such as units of measurement, exchange codes, currencies, and country codes).

Various types of data management are disclosed herein. Data management specialties may fall under one or more of the areas discussed below.

Master data management: Master data management (MDM) may be the process of ensuring that a given organization is always working with, and making business decisions based on, a single version of current, reliable information. Ingesting data from all data sources and presenting it as one constant, reliable source, as well as re-propagating data into different systems, requires the right tools.

Data stewardship: A data steward may deploy and enforce information management policies across an enterprise. A data steward may oversee enterprise data collection and movement policies, ensuring practices are implemented and rules are enforced.

Data quality management: A data quality manager may supplement or complement a data steward. Quality management may be responsible for combing through collected data for underlying problems like duplicate records, inconsistent versions, and more. Data quality managers may support defined data management systems.

Data security: An aspect of data management may be security. Though emergent practices like DevSecOps incorporate security considerations at every level of application development and data exchange, security specialists are still tasked with encryption management, preventing unauthorized access, guarding against accidental movement or deletion, and other frontline concerns.

Data governance: Data governance may set the law for an enterprise's state of information. A data governance framework (e.g., a data constitution) may clearly outline policies for the intake, flow, and protection of institutional information. Data governors oversee their network of stewards, quality management professionals, security teams, and other people, systems, and/or data management processes in pursuit of a governance policy that serves a master data management approach.

Big data management: Big data may be a catch-all term used to describe gathering, analyzing, and using massive amounts of digital information to improve operations. In broad terms, this area of data management may specialize in intake, integrity, and/or storage of the tide of raw data that other management teams and/or systems use to improve operations and security or inform business intelligence.

Data warehousing: Data warehouse management provides and oversees the physical and/or cloud-based infrastructure used to aggregate raw data and analyze it in-depth to produce business insights.

Traditional data governance includes a number of challenges. Traditional data governance was successful given a limited number of data stores and waterfall model development. Reactive governance was preferred with traditional data governance. For example, as shown in diagram 100 of FIG. 1, four pillars of a traditional data governance framework are Data Security and Privacy 105, Data Quality 110, Data Access and Search 115, and Master Data Management 120.

With improvements in cloud data storage and agile development, traditional data governance fails to keep up to speed and is often penalized. For example, these include General Data Protection Regulation (GDPR) penalties and data breach fines.

The current rate of breaches and penalties requires investment in appropriate data governance strategies and tooling. Traditional data governance used by digital businesses is likely to fail without necessary data governance. Additionally, results in accordance with the disclosed subject matter show best governance practices and innovation mitigate penalties (e.g., legal actions) and help to drive more business value.

While implementing privacy controls (e.g., Canada Office of Privacy Commissioner (OPC), California Privacy Protection Act (CPPA), California Consumer Privacy Act (CCPR), etc.), enforcing any ongoing governance policies can be expensive without integrated end-to-end governance. Additionally, many data-driven entities face more challenges because of the following pain points. FIG. 2 shows a diagram 200 of drawbacks associated with traditional data governance, including a tick-box approach for compliance 205, a lack of understanding of the data landscape 210, no right ownership and lead by silo initiatives 215, not understanding the maturity of the organization 220, failure to embed a framework 225, data governance conceptualized as a project 230, misalignment with the intended strategy 235, attempting a "Big Bang" approach 240, or thinking a tool is the answer 245.

Figure 3:
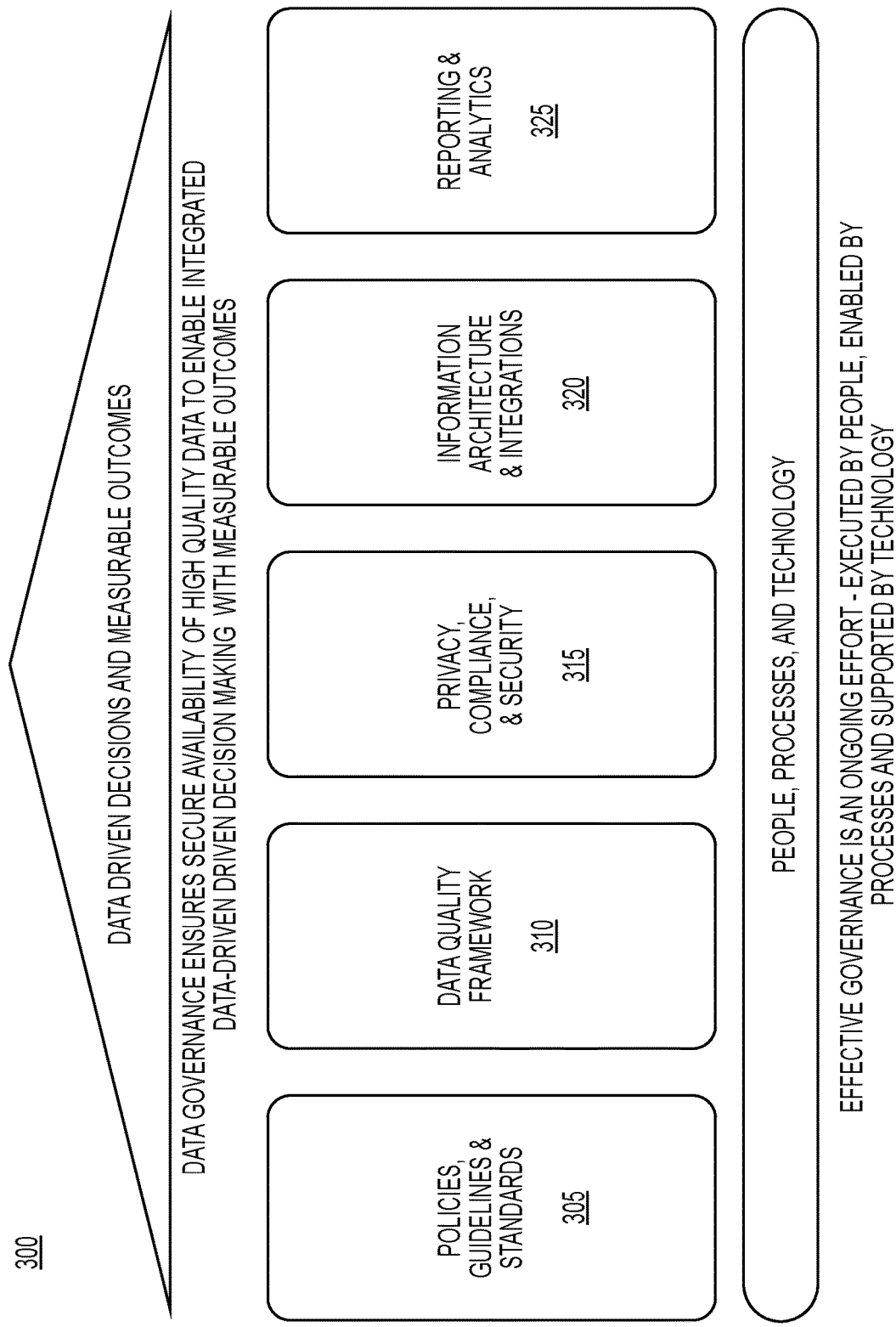
FIG. 3 is a flow diagram that depicts a data governance implementation, according to embodiments of the disclosure.

FIG. 3 shows a data governance flow diagram 300 in accordance with the subject matter disclosed herein. For example, data governance may enable secure availability of high quality data to enable integrated data-driven decision making with measureable outcomes. Data governance may be an ongoing effort, executed by automated systems, enabled by processes, and supported by rule based algorithms and/or machine learning models. Policies, guidelines, and standards 305, data quality framework 310, privacy, compliance, and security 315, information architecture and integrations 320, and reporting and analytics 325 may be utilized in data governance.

In accordance with the disclosed subject matter, an organization's governance may be reformed by creating standardized Data Governance as a Service (DGaaS) to accelerate driven decisions and seamlessly mitigate enterprise data risk.

According to embodiments of the disclosed subject matter, a DGaaS system may be implemented to govern certain aspects of an organization's data systems. During a registration process, data sets of the organization may be identified and registered with the DGaaS system. Such registration may include identifying the type of data within the data set, content associated with the data set, schema of the data, and access rights associated with the data set. Such registration may be implemented by parsing data sets to classify the dataset based on type, content, schema, and/or access rights. Such parsing may be performed based on metadata associated with the data set. Such parsing may be implemented using a parsing machine learning model trained using historical or simulated data sets that may be tagged. The tags may identify type, content, schema, and/or access rights associated with meta data of training data sets and may further identify risk classifications (e.g., based on sensitivity of data) associated with the training data sets. The parsing machine learning model may receive, as inputs, the data associated with the data sets and may output the type, content, schema, and/or access rights associated with the datasets based on correlations between the data sets and training data sets. The parsing machine learning model may further output a risk classification of the data sets based on correlations between the data sets and training data sets. Each data set may be labeled based on corresponding output type, content, schema, access rights, and/or risk classification for downstream use.

During a maintenance and usage process, registered data assets may be regularly inventoried to determine usage metrics (e.g., type of access, frequency of access, location of access, etc.). A given dataset may further be labeled based on such usage metrics to determine active consumption (e.g., above a threshold) or inactive consumption (e.g., below a threshold). During the maintenance and usage process, changes to the data set may also be identified to update any existing labels associated with the data set in accordance with techniques discussed herein. Based on the updated labels, attributes of the data set, such as access rights, may be updated or one or more alerts may be generated based on the same. Further, access information may be analyzed in view of risk classifications of a data set. If the access information indicates access outside of approved access rules in view of the risk classification, the data set may be flagged and/or one or more alerts may be generated based on the same.

During a retention process, the dataset labels may be analyzed to determine whether to retain or discard the data associated with the dataset. The decision of whether to retain or discard the data may be based on, for example, active consumption versus inactive consumption and/or based on access information. Data flagged to be discarded (e.g., due to inactive consumption) may be discarded based on the rules and/or policies implemented by the governance system.

The governance system disclosed herein may be applied across multiple subsets of an organization. For example, during a retention process, if a given dataset associated with a first subset of the organization is discarded, the governance system may trigger an analysis of similar data sets (e.g., within a similarity threshold) across the organization. As a result, one or more similar data sets of a second subset of the organization may be discarded without having to otherwise implement a retention process for data sets of the second subset of the organization. Accordingly, in accordance with the governance system disclosed herein, data may be managed across multiple subsets of an organization in a more efficient and systematic manner in comparison to traditional techniques. Such cross-subset implementation of the governance system may allow for faster and cohesive data management in comparison to traditional techniques. Such cross-subset implementation of the governance system may also reduce the resources expended to manage data by centralizing the governance process instead of implementing such processes independently across subsets of an organization. Such cross-subset implementation of the governance system may also reduce resource expenditure by reducing redundancies across multiple subsets of an organization. Although examples are provided herein in reference to the retention process, it will be understood that cross-subset implementations may be performed for one or more of the registration, maintenance and usage, and/or retention processes.

According to embodiments disclosed herein, the registration, maintenance and usage, and/or retention processes may be cyclical such that a given process may inform a different process. For example, during a retention process, data identified to be retained and/or discarded may be provided as training data for an iterative registration process such that new data to be registered may be tagged, at least in part, based on the data tagged during the retention process. Similarly, data from a first subset of an organization may be tagged and used as training data to label data form a second subset of an organization.

Modern data governance strategies may include a Strategy A, a Strategy B, a Strategy C, and/or a Strategy D. Strategy A may correspond to implementing data governance as a shared responsibility between a data governance system and the data owner system. Strategy B may correspond to an implementation of proactive data governance. This implementation may start with creating new data sources until data governance is available to users for general availability. Therefore, data governance plays a role from the very beginning of a data generation and/or management process.

Strategy C may be implemented by leveraging the right scalable data governance tools that can easily integrate into the organization's existing environment and being available to everyone is essential. Approximately 100% automation with personnel user experience helps to drive such governance. Strategy D may be implemented by continued application of data governance standardization using GDaaS.

Traditionally, an entity's governance may follow the conventional reactive approach while applying data governance policies such as "Canada OPC" (CCPA), Sensitive Data Remediation, Data Registration coverage, etc. Data owner systems may be informed to remediate their data as a reactive measure.

Such traditional data governance may not include clear roles and responsibilities between, for example, a data governance system versus a data owner system. Such traditional implementations may not include proper data ownership models for data governance.

Figure 4:
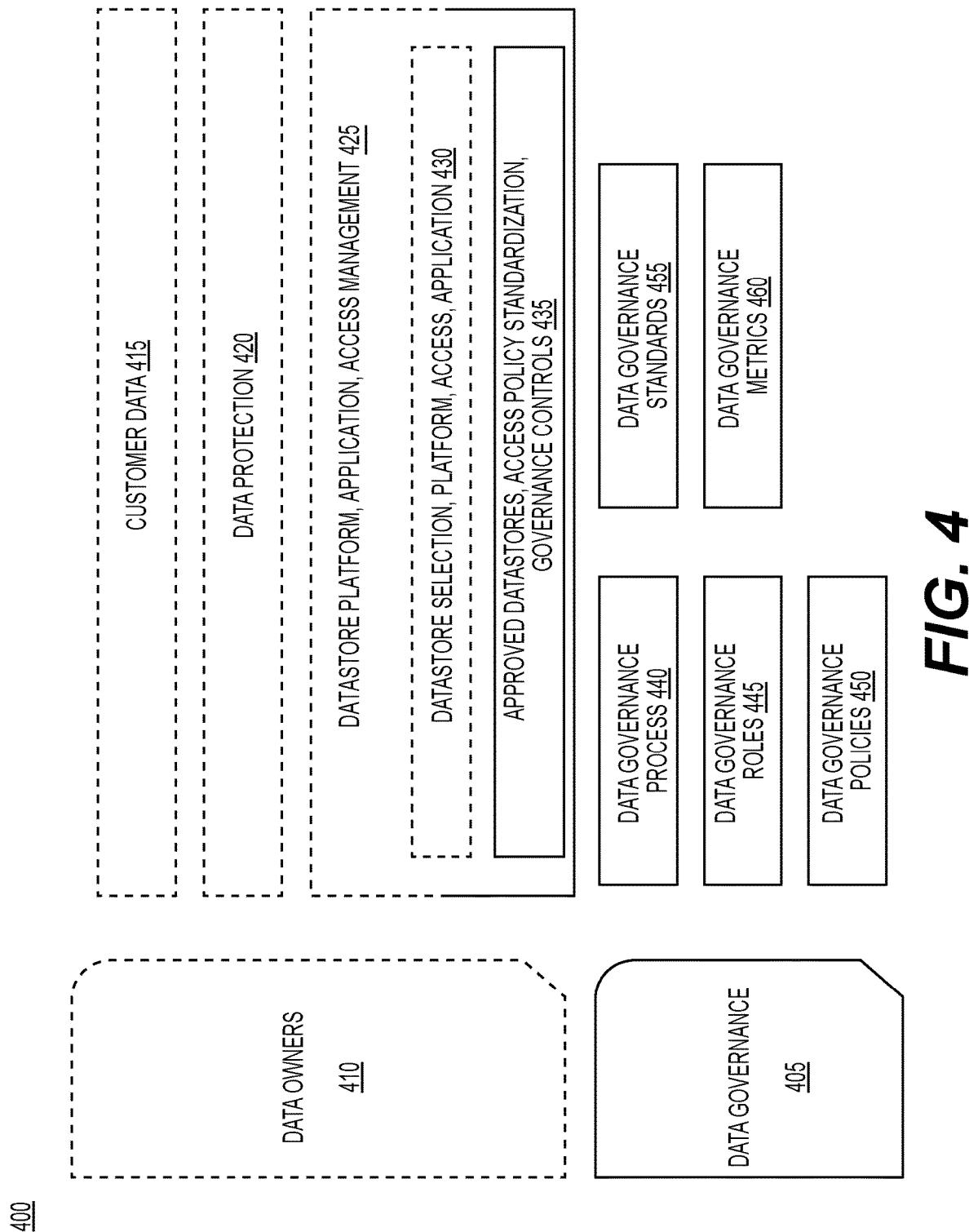
FIG. 4 depicts an exemplary shared responsibility model, according to embodiments of the disclosure.

FIG. 4 provides an example shared responsibility model 400, in accordance with the techniques disclosed herein. As shown in FIG. 4, data management may be implemented as having shared responsibilities between a data governance system 405 (e.g., data governance process 440, data governance roles 445, data governance policies 450, data governance standards 455, data governance metrics 460) and at least one data owner systems 410 (e.g., customer data system 415, data protection system 420, data store platform, application and/or access management 425). Data store platform, application and/or access management 425 may include a data store selection, platform, access, and/or application system 430 (e.g., may be part of data owners system 410) and/or approved data stores, access policy standardization, and/or governance controls system 435 (e.g., may be part of data governance system 405).

As depicted in FIG. 4, data owner systems 410 may implement a data store platform, application and/or access management 425 in accordance with approved data stores, access policy standardization, and/or governance controls system 435. Approved data stores, access policy standardization, and/or governance controls system 435 may use one or more trained machine learning models to output one or more of a data governance process 440, data governance roles 445, data governance policies 450, data governance standards 455, and/or data governance metrics 460. For example, as discussed herein, during a registration process, new data may be labeled and/or organized in accordance with such roles, policies, standards, and/or metrics, based on historical labeling and/or organization. Such machine learning models may be trained based on the organization's historical or simulated data which may be tagged based on approved processes, roles, policies, standards, and/or metrics. For example, data store selection, platform, access, and/or application system 430 may be organized and/or updated based on outputs provided by such a machine learning model.

A shared responsibility, as referenced herein, refers to the at least one data owner system 410 selecting a right data store and maintaining its data in accordance with approved data stores, access policy standardization, and/or governance controls system 435. Customer data system 415 and its access and controls may also be protected in accordance with approved data stores, access policy standardization, and/or governance controls system 435. The data governance system's responsibilities may include monitoring data and defining controls around data governance processes 440, data governance roles 445, data governance policies 450, data governance standards 455, and/or data governance metrics 460.

Figure 5:
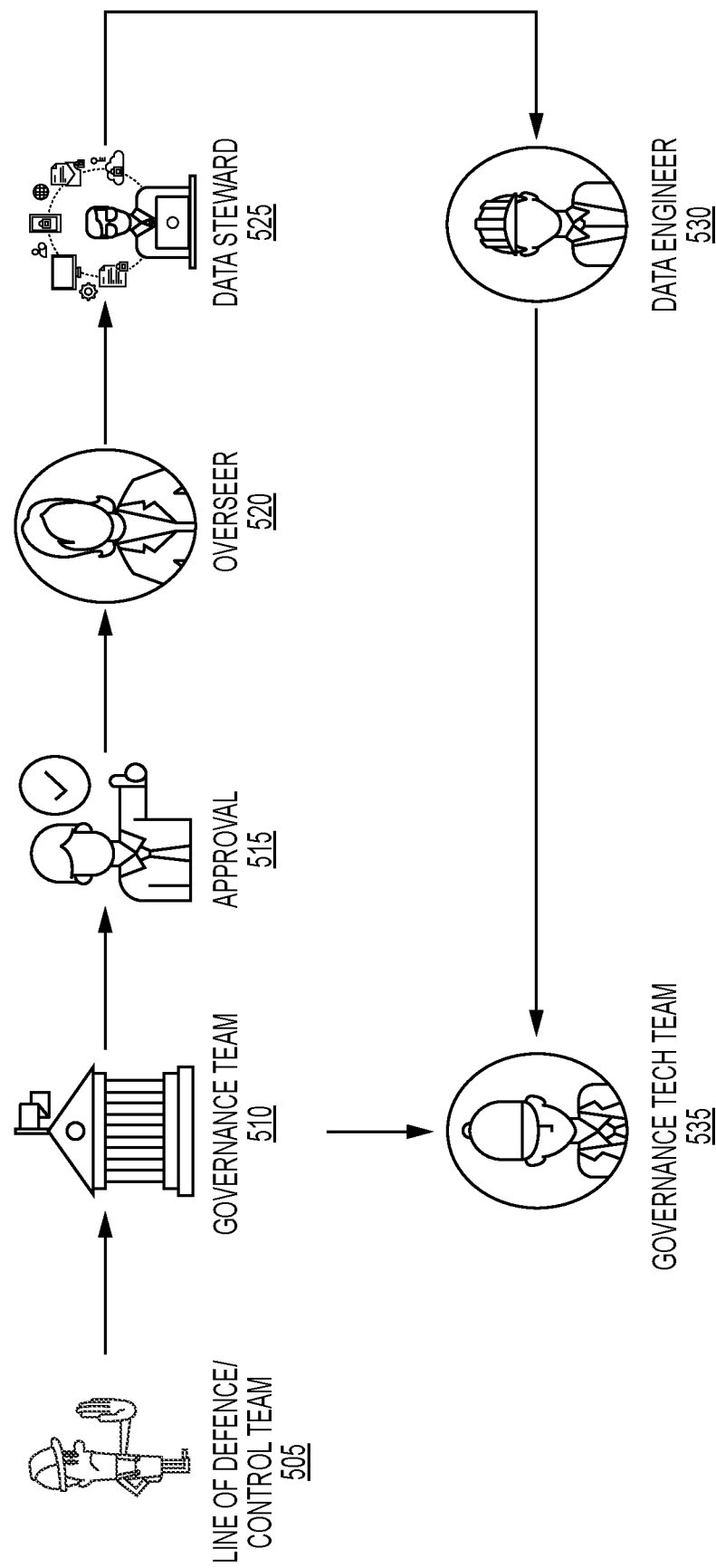
FIG. 5 is a flow diagram that depicts an exemplary traditional data ownership model, according to embodiments of the disclosure.

Refining a data ownership model is further discussed herein. FIG. 5 shows an example traditional data ownership model 500. FIG. 5 shows how an organization may apply regulatory policies to controls (e.g., a waterfall model). For example, as shown in FIG. 5, data may flow from a control team 505 to a governance team 510, which may be associated with a governance tech team system 535. From the governance team 510, the data may flow to an approval system 515, an overseer system 520, a data steward system 525, and data engineer system 530, and/or the governance tech team system 535.

A challenge under this traditional model may be that the data steward systems 525 (e.g., data analyst systems or product owner systems) and data producer systems (e.g., data analyst systems or data engineer system 530) may traditionally be two different roles. Accordingly, while applying any new control, both systems may need to be updated and respective teams may need to be educated/updated.

Additionally, when applying any new policy controls, data consumers may not be informed of such updates as they may traditionally not be considered a part of the data ecosystem. Another challenge may be that data owner systems and/or teams (e.g., account executives, managing data stewards, etc.), may not be informed regarding who their data stewards and producers/consumers are and what data they own and/or manage.

Accordingly, technical solutions are needed to define appropriate (e.g., accurate or aligning with best practices) data ownership. For example, data stewards, data producers, and/or data consumers may be accountable for producing and consuming data in accordance with approved data stores, access policy standardization, and/or governance controls system 435.

Figure 6:
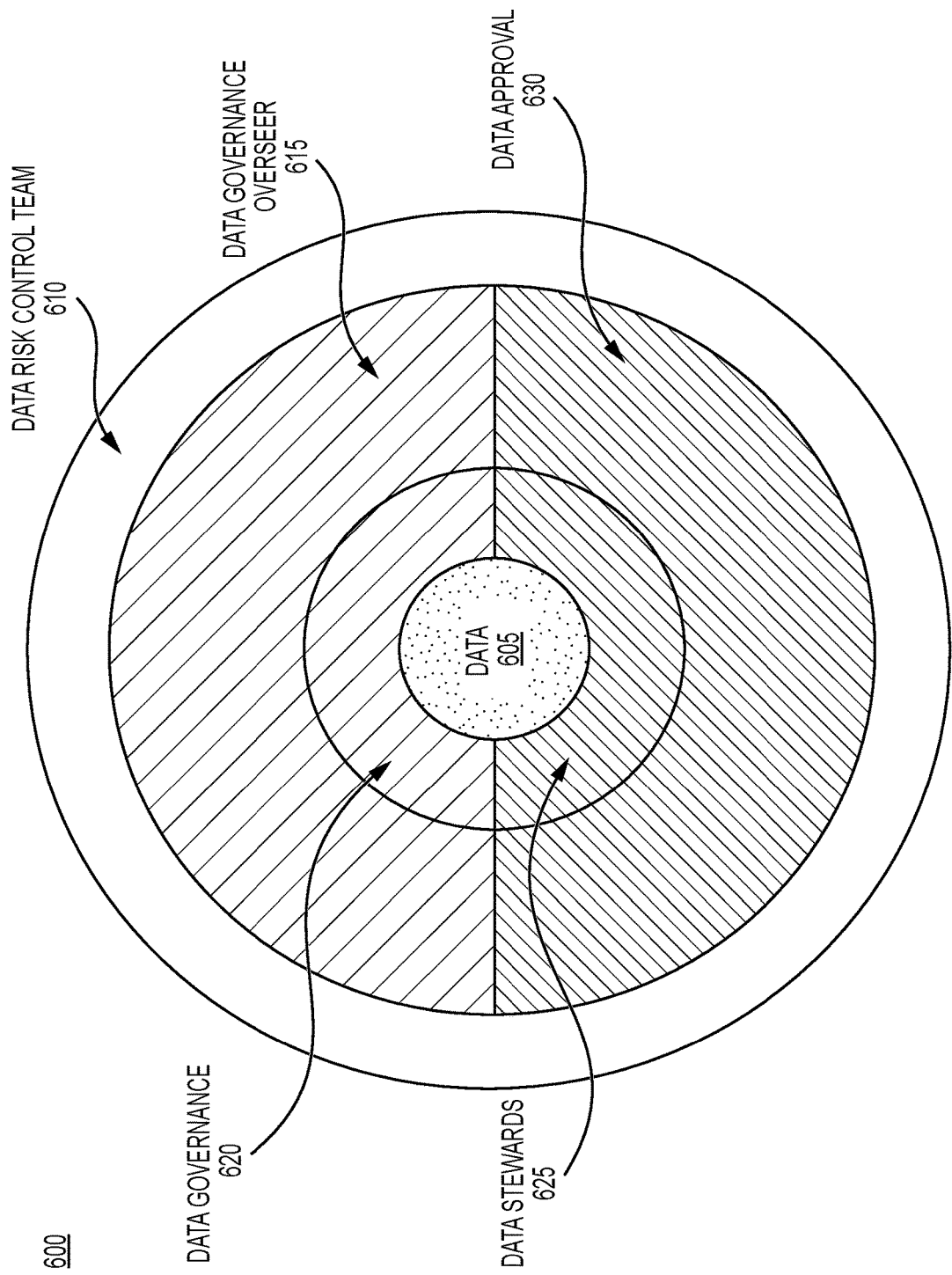
FIG. 6 is a chart that depicts an exemplary education structure for data owners, according to embodiments of the disclosure.

As shown in chart 600 of FIG. 6, in accordance with Strategy A, data owner systems (e.g., the at least one data owner systems 410) and respective models may be iteratively trained in accordance with changing policies and responsibility metrics, data governance controls associated with their data (e.g., data 605) and/or a data ecosystem associated with a given organization. Such training may be based on tagged data and/or previously analyzed data, as discussed herein. Regular iterative updates (e.g., system updates, etc.) may be shared across multiple subsets of an organization for application to their respective data sets, in a centralized manner. Data Risk Control Team system 610 may include a Continuous Diagnostics and Mitigation (CDM) program, audits (e.g., regular audits), cad risk, etc. Data governance system 615 may include a managing data steward module. Data governance oversteer system 620 may include one or more machine learning models, as discussed herein. Data steward modules 625 may include a performing data steward model, a data tech system (e.g., including one or more machine learning models), and/or a data consumer system. Data approval system 630 may include an automated approval model configured to output approvals and/or alerts in accordance with the registration, maintenance and usage, and/or retention processes discussed herein.

In accordance with Strategy C, correct scalable data governance tools may be identified. These tools may include a people-centric inventory management view, a Data Governance as a Service (DGaaS) implementation, and/or automation. A data governance tool applicable to a given data system may be identified using a machine learning model trained to output such a tool based on inputs such as data type, data size, data sensitive, and/or data owner. Such a machine learning model may be trained using historical or simulated data types, data sizes, data sensitives, and/or data owners to optimize (e.g., reduce) a likelihood of breach, likelihood of disorganization, likelihood of data loss, and/or the like. For example, for a given data system with the data, the new data may be parsed to identify its respective data type, data size, data sensitivity, and data ownership. The data type, data size, data sensitivity, and data ownership may be input into a machine learning model which may output a data governance process, role, policies, standards, and metrics for the new data. The output may be based on training the model using tagged historical or simulated data having varying data types, data sizes, data sensitivities, and data ownership. The machine learning model may, at least in part, correlate the new data with a closest historical or simulated training data to generate the output.

A "Service Now" platform may store all data storage used across an entity, and may include its various data attributes. A "Catalog" platform may manage datasets within each data platform. An "Exchange Dataset" user interface may provide a single pane, granular dataset-centric view.

In accordance with a holistic inventory management view, to get a complete picture of a data landscape, first, all data stores listed in a Service Now platform may be retrieved and then mapped to the Catalog to identify their respective datasets. Challenges in syncing various data attributes across both platforms may be presented.

Accordingly, data governance inventory management dashboards with a holistic view may be provided. Rather than a data catalog, a dataset view which may provide a holistic view of the data landscape for all subsets of an organization may be provided. For example, data governance inventory management dashboards may provide interface content including type, content, schema, access rights, and/or risk classifications associated with data sets across an organization. Such interface content may be displayed based on an organization hierarchy determined based on one or more of the type, content, schema, access rights, and/or risk classifications associated with each respective data set across an organization. The organization hierarchy may be updated such that the interface content is displayed in a different manner at a first time in comparison to a second time. The updates may be made based on changes to one or more of the type, content, schema, access rights, and/or risk classifications associated with a given data set.

A host location (e.g., electronic location) associated with one or more data governance tools may be determined. In accordance with the techniques disclosed herein, a DGaaS platform may be leveraged to determine, access, and/or manage such locations. This approach may help organizations operate free from traditional resource and technical limitations as such tools may be identified and accessed by the DGaaS platform irrespective of which subset of an organization a tool is associated with. Because of growing data ecosystems, many data management tools have emerged lately to support functionality. Those tools include machine learning models and/or other tools to implement registration, maintenance and usage, and/or retention policies. Embedding data governance within each ecosystem may be essential without impacting core functionality. Techniques disclosed herein implement a governance DGaaS platform as a solution to accelerate data governance.

Traditional data governance may be managed through excel sheets, duplicating and implementing repetitive exercises. Also, data management tools such as catalogs, retention tools, case management tools, data quality tools, and/or data security tools are traditionally independent platforms that do not interact with each other.

Accelerated data governance may require data monitoring across data management tools, data quality, applying data standardization, and finding their lineage with automation tools (e.g., approximately 100% automation tools). For example, outputs from such data management tools may be used to train machine learning models trained in accordance with the techniques disclosed herein. Such outputs may be used to determine correlations between data analyzed using such tools and data sets to be analyzed. Data governance automation may be augmented using machine learning solutions for schema, data lineage, and anomaly detections.

Figure 7:
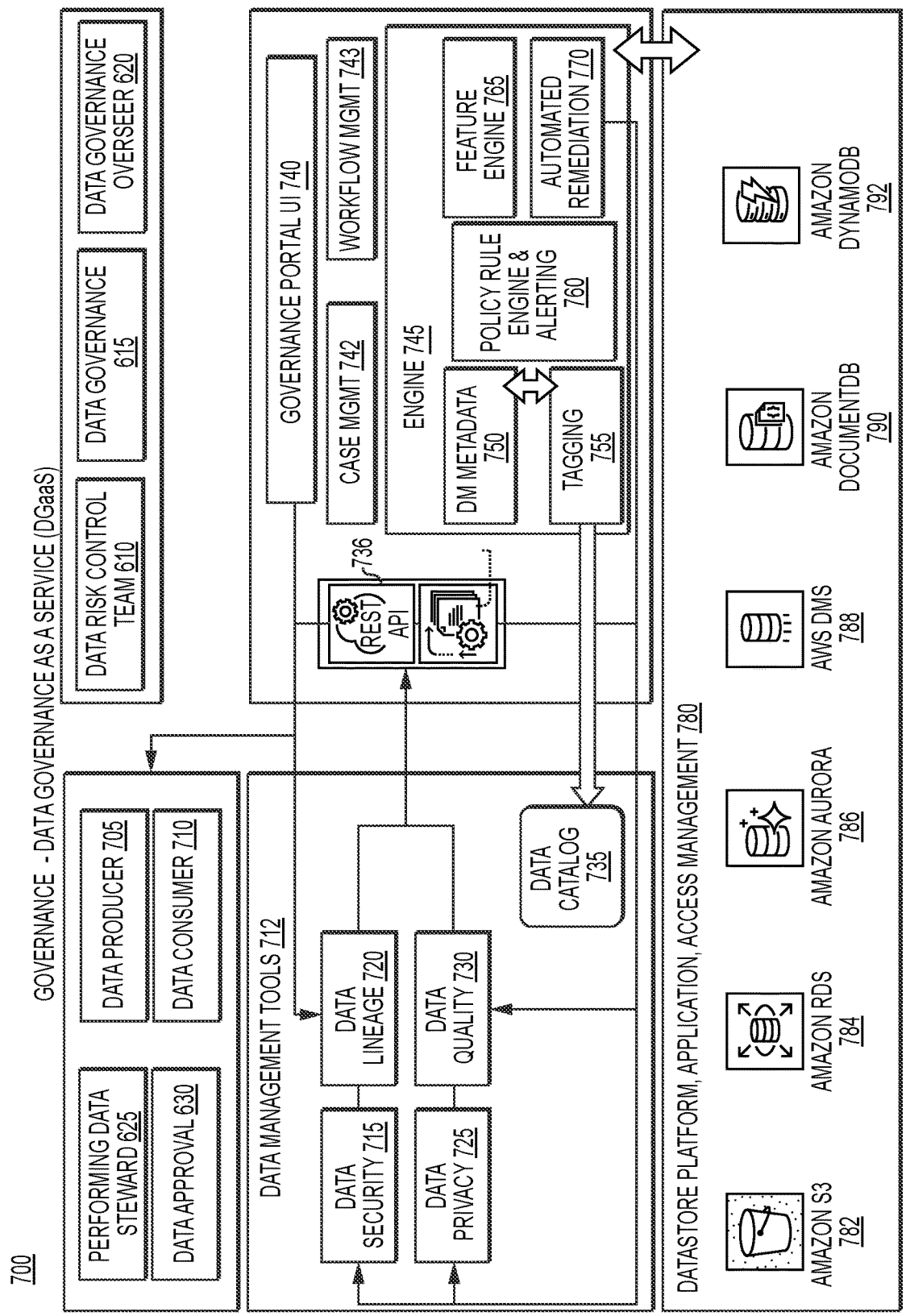
FIG. 7 is a system environment that depicts an exemplary Data Governance as a Service (DGaaS) system, according to embodiments of the disclosure.

FIG. 7 shows a flow diagram 700 of a governance DGaaS system discussed herein. In accordance with Strategy C, proactive data governance may be used to implement the registration, maintenance and usage, and/or retention processes disclosed herein. A challenge in data governance includes implementing governance controls after data platforms are available to users. This challenge traditionally required completely redesigning data platforms services for migration to a new governance process. According to the embodiments disclosed herein, such registration, maintenance and usage, and/or retention processes may be implemented based on existing data systems. Further, as a part of proactive governance, before onboarding any new platform or data sets for an organization, registration, maintenance and usage, and/or retention processes may be performed on the platform and/or data sets to ensure that a given platform is ready for all data management tools (i.e., data security, access patterns, data retention, data privacy) and embedded into every lifecycle of data within a data platform.

As shown in flow diagram 700 of FIG. 7, starting with a core engine (e.g., engine 745), metadata based data management may be triggered. During a registration process, data may be labeled in accordance with the techniques disclosed herein to define the data and determine how well certain data sets are integrated into one or more data management systems. Case management system 742 may receive a case (e.g., including one or more data sets). Case management system 742 may extract metadata associated with the case. A registration process may be triggered to label the data sets associated with the case, in accordance with the techniques disclosed herein. Such labeling may include labels for one or more of a type, content, schema, access rights, and/or risk classification associated with metadata of the case. After defining and/or tagging precise metadata (e.g., via DM Metadata system 750 and/or tagging system 755, respectively), a policy rule and alerting engine 760 may monitor and apply new policies. Policy rule and alerting engine 760 may apply the policies during the registration process using a machine learning model that outputs applicable policies based on the tagged metadata.

A dashboard (e.g., Governance Portal User Interface (UI) 740) may generate an interface based on the tagged metadata, where the interface may provide a complete holistic picture of the data sets associated with the case. The dashboard may provide detailed granularity on each policy violation, along with a recommended resolution for each violation (e.g., via feature engine 765, automated remediation system 770, etc.). The workflow management system 743 may allow a governance system to create custom workflows to expedite controls. Workflow management system 743 may automatically provide a resolution to each policy violation and may, in certain embodiments, implement such resolutions. The resolutions may be output by a resolution machine learning model trained based on historical data sets, respective violations, and respective resolutions. Accordingly, the resolution machine learning model may identify correlations between such historical or simulated data sets, respective violations, and respective resolutions to identify a corresponding resolution for the data set of a given case. Accordingly, this DGaaS implementation may automate end-to-end data governance with proactive monitoring and remediation.

In accordance with flow diagram 700 of FIG. 7, a governance system may include or communicate with one or more data stores and data management tools 712. Governance Portal user interface (UI) 740 may provide data or metadata analyzed by engine 745 to data management tools 712. Data management tools 712 may determine and/or implement the resolutions based on the policy violations discussed herein. Such violations may be resolved using on at least one of data security system 715, data lineage system 720, data privacy system 725, and/or data quality system 730. Outputs from such systems may be provided to engine 745 for further analysis (e.g., post implementation of one or more resolutions), as discussed herein. Engine 745 may verify resolution of such violations prior to storage and/or use of corresponding data.

Data security system 715 may secure metadata that may be susceptible to security violations based on one or more data security rules. Data lineage system 720 correct data schema drifts in accordance with one or more schema rules. Data privacy system 725 may tag, redact, or otherwise secure data that meets a privacy or sensitivity threshold. Data quality system 730 may correct data errors using one or more error correction processes selected based on metadata for a given dataset identified as having a data quality based violation.

Data with unresolved violations may be escalated to data risk control team system 610, data governance system 615, and/or data governance oversteer system 620 (e.g., remedial systems). The system to escalate a given violation may be identified based on the type of violation, and/or metadata associated with the violation. Data risk control team system 610, data governance system 615, and/or data governance oversteer system 620 may determine and/or implement a resolution (e.g., using data management tools 712) and/or may override a violation by marking a violation as an acceptable violation.

Data with no violations, resolved violations, or violations marked as acceptable violations may be transmitted to a data store platform, application, and/or access management system 780. The data store platform, application, and/or access management system 780 may include, but is not limited to, at least one of Amazon S3™ 782, Amazon Relational Database Service (RDS)™ 784, Amazon Aurora™ 786, Amazon Web Services (AWS)™ Database Migration Service (DMS)™ 788, Amazon Document Database (DocumentDB)™ 790, Amazon Dynamo Database (DynamoDB)™ 792, and/or the like.

Figure 8:
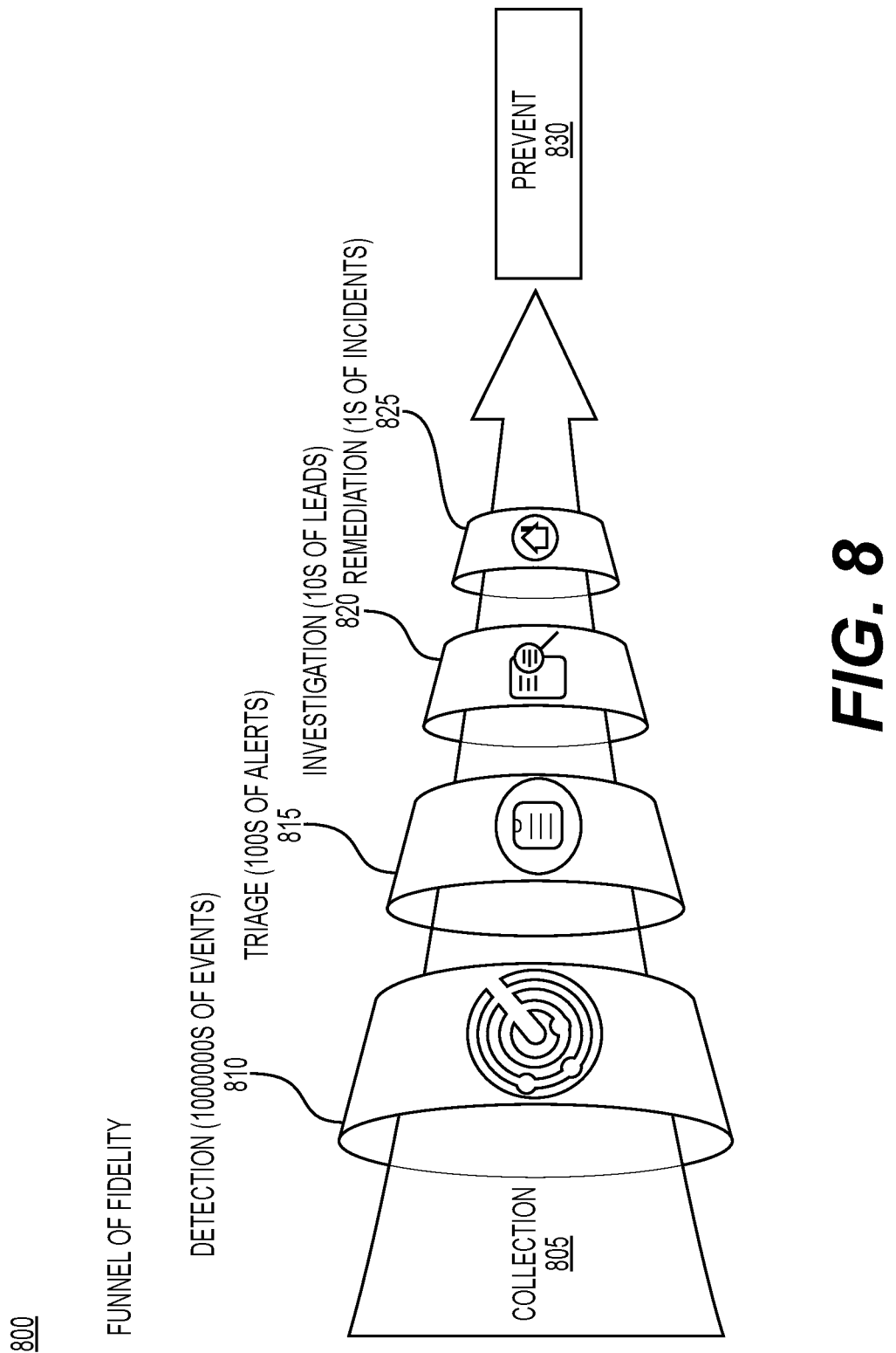
FIG. 8 is a data flow chart for the DGaaS of FIG. 7, according to embodiments of the disclosure.

FIG. 8 shows an example data flow 800 for a governance DGaaS system. As depicted in FIG. 8, the data flow for governance DGaaS may result in detecting, for example, approximately millions of events, which are triaged to a subset of events having violations with corresponding alerts, a subset of which may be resolved or marked as acceptable violations, which may result in a data set having no outstanding violations such that data infidelity prevented.

In collection phase 805 and detection phase 810, a governance system may integrate various components and/or collect metadata of a data set. Such a governance may provide various application programming interfaces (API) to gather real-time metadata from each data management system, such as, for example, one or more of a Data Catalog 735 (e.g., Data sets, Data Stewards, schema, etc.), Data Security system 715 (e.g., NPI indicator, PCI indicator, Sensitive data element, etc.), Data Quality system 730 (e.g., Data accuracy, data reliability, etc.), etc. The system may also provide a batch interface to gather historical metadata.

In triage phase 815, policy rule and alerting engine 760 may be executed using a metadata management system (e.g., DM Metadata system 750 or engine 745) and may monitor metadata for policy violations. In addition, machine learning models executed in compliance with policy rules and alerting engine 760 may identify and reduce false positives.

In investigation phase 820, after triage phase 815, metadata associated with data sets having potential violations may be fed into a case creation module (e.g., case management system 742). A case may be assigned to Data Owner systems or teams (e.g., a Data Producer 705, a Data Consumer 710, etc.) which may be alerted to take action based on detected violations. The automated remediation tool may provide auto recommendations for case violations (e.g., using data management tools 712).

In remediation phase 825, automated remediation tools (e.g., data management tools 712) in communication with engine 745 may initiate workflows to manage violations. In prevention phase 830, Governance Portal UI 740 may review and/or close cases in collaboration with data risk control team system 610, data governance system 615, and/or data governance oversteer system 620, as discussed herein.

The governance implementation disclosed herein may include components such as Core Services (e.g., Metadata Management module 750, Policy Rule Engine & Alerting module 760, Automated Data Remediation module 770, Feature Engine module 765, etc.), an interface (e.g., Inventory Management Dashboards 736, Case Management System 742, Workflow Management System 743, etc.), and/or other components (e.g., automation components, machine learning modules for violation detection, etc.).

Metadata Management module 750 may apply management policies to label metadata (e.g., during a registration process). Policy Rule Engine & Alerting module 760 may identify or receive violations, as discussed herein, and may generate alerts based on such violations. Automated Data Remediation module 770 may apply a remediation machine learning model to identify remediation actions associated with the violations, which may be implemented using data management tools 712. Feature Engine module 765 may extract features from metadata to categorize or cluster metadata based on associated labels. Inventory Management Dashboards 736 may provide inputs to one or more dashboards to provide a holistic view, as discussed herein. Case Management System 742 may monitor statuses of respective cases and associated violations and/or remediation actions. Workflow Management System 743 may prioritize and/or deprioritize cases for remediation and may provide inputs to Case Management System 742 to manage the cases based on such priorities.

Figure 9:
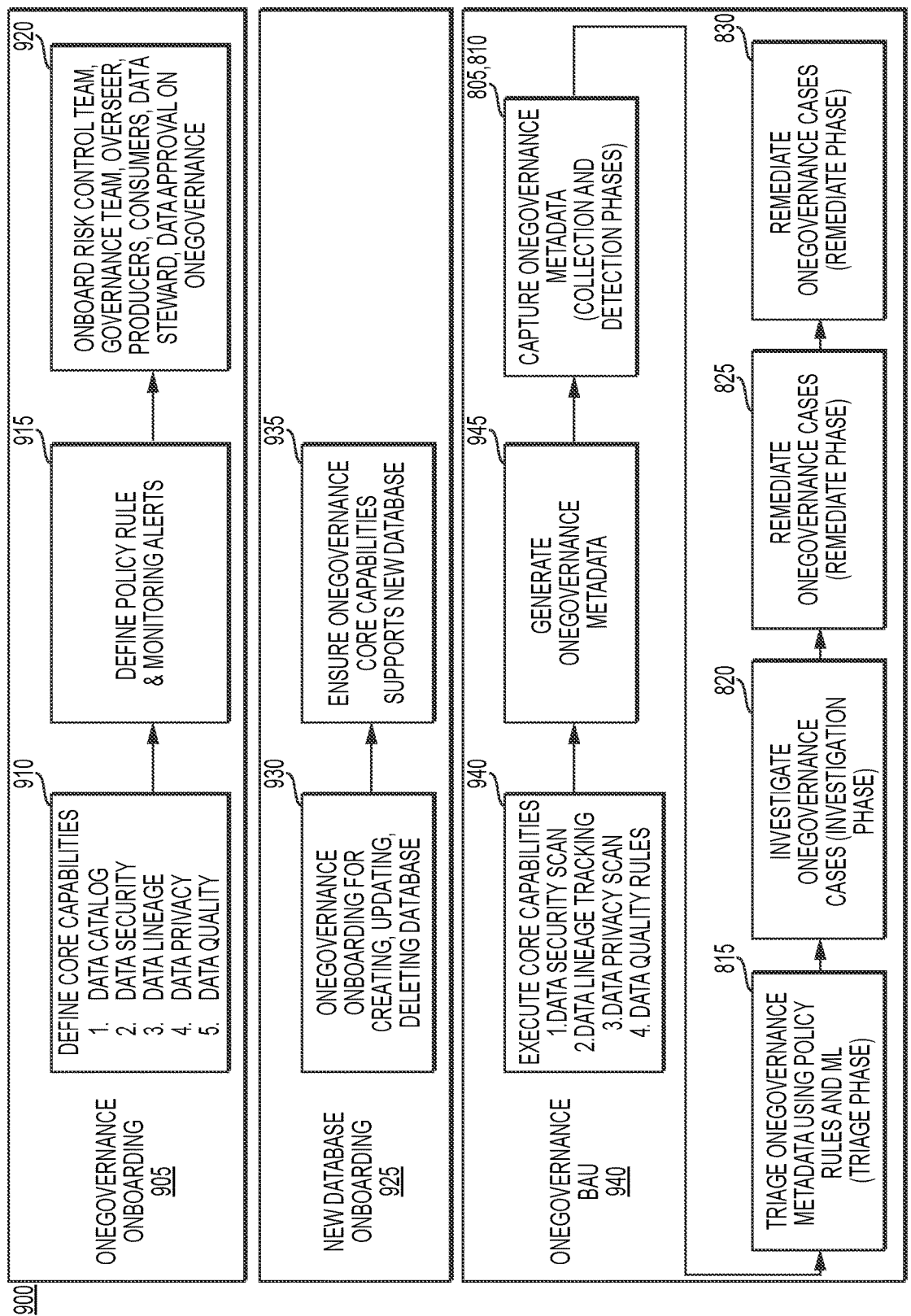
FIG. 9 is flow diagram of data governance onboarding and execution, according to embodiments of the disclosure.

FIG. 9 depicts a flow diagram of Governance onboarding and execution, according to one or more embodiments. During Governance Onboarding 905, the system may define core capabilities at 910, define policy rules and monitoring alerts at 915 (e.g., via policy rule engine and alerting module 760), and/or onboard at least one system at 920 (e.g., during a registration phase). Defining core capabilities at 910 may include defining attributes, rules, and/or properties associated with data security system 715, data lineage system 720, data privacy system 725, data quality system 730, data catalog 735, etc. the at least one system on-boarded at 920 may include data risk control team system 610, data governance system 615, data governance system 620, data steward modules 625, data approval system 630, data producer 705, data consumer 710, etc.

During New Database Onboarding 925, a governance system may onboard, create, update, and/or delete at least one new database at 930 and, at 935, confirm that the governance core capabilities determined at 910 support the new database at 930.

During Governance Business As Usual (BAU) 940, Governance may execute core capabilities at 945 and generate governance metadata at 950. The governance system may further enter collection phase 805, detection phase 810, triage phase 815, investigation phase 820, remediation phase 825, and/or prevention phase 830. Triage phase 815 may include using policy rules and/or machine learning to filter data sets in accordance with techniques disclosed herein.

In accordance with Strategy D, data governance standardization may be applied using a governance system, as discussed herein. Such standardization may be applied by utilizing the centralized components discussed in reference to FIG. 7 to analyze metadata for data sets across multiple subsets of an organization. Data associated with violations identified and/or remediated at a first time may be used as training data for implementing a registration process, maintenance and usage process, and/or retention process, at a second time, as discussed herein.

Figure 10:
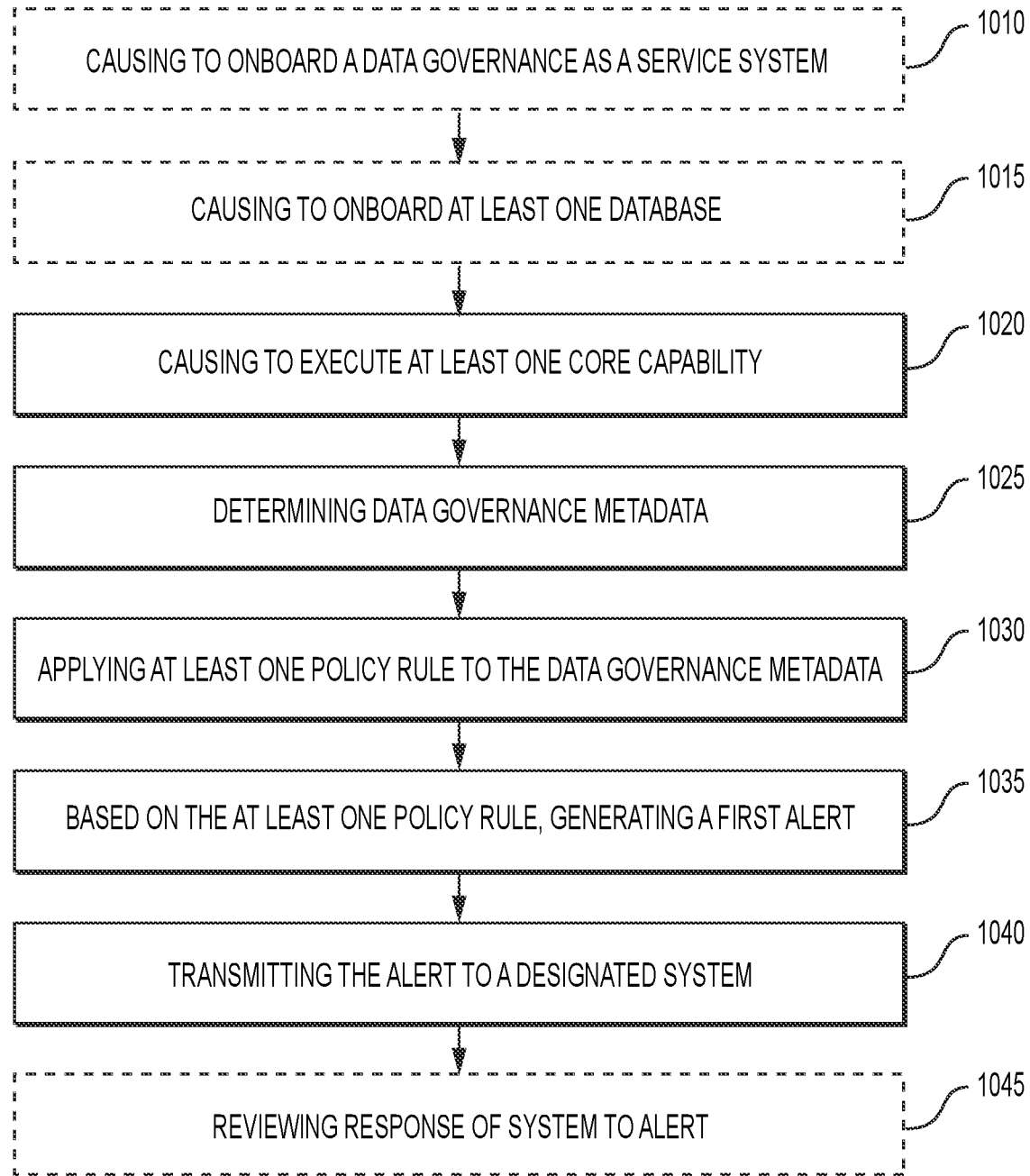
FIG. 10 is a flowchart that depicts a method for data governance as a service, according to embodiments of the disclosure.

FIG. 10 depicts an exemplary flowchart 1005 for data governance as a service, according to one or more embodiments. At step 1010, a data governance as a service system (e.g., as shown in FIG. 7) may be on-boarded to a server. Onboarding the data governance as a service system may include defining at least one core capability (e.g., at least one of the core capabilities defined at 910 of FIG. 9) which may be a system or module configured to utilize governed data, modify data, remediate data, and/or override violations. Onboarding the data governance as a service system may include onboarding at least one data governance system, such as data risk control team system 610, data governance system 615, data governance oversteer system 620, data steward modules 625, data approval system 630, data producer 705, data consumer 710, etc. Such a system or module may define policy rules and/or monitoring alert rules to be implemented using one or more other components of flow diagram 700 of FIG. 7.

At step 1015, at least one database, including one or more data sets, may be received and/or on-boarded to the data governance as a service system. In some embodiments, the at least one database may be analyzed (e.g., in accordance with flow diagram 700) to confirm the core capabilities (e.g., core capabilities determined at 910) support the at least one database. Such confirmation may include determining whether the one or more datasets of the database are in a format and/or include metadata that can be interpreted, processed, analyzed, or otherwise recognized by the core capabilities. It will be understood that the database may be an existing database for a given organization or may be a new database and/or may include new datasets. In either scenario, the database and corresponding data sets may be processed via the registration process, maintenance and use process, and/or remediation process over a period of time.

At step 1020, the data governance as a service system may be caused to execute the at least one core capability. The at least one core capability may include application of data security, data lineage, data privacy, data quality, or a data catalog to the data sets of the database. A core capability for execution may be determined based on which process (e.g., registration process, maintenance and use process, and/or remediation process) corresponds to the received or on-boarded database. For example, a core capability may be implemented to facilitate a maintenance and use process if the data sets of the database have been registered. It will be understood that a given database may undergo any given process in an iterative manner. For example, a database that is already registered may undergo the registration process again based on updated core capabilities (e.g., updated based on new or more recent training data, updated based on prior policy implementations, etc.).

At step 1025, the data governance as a service system may determine data governance metadata based on the data sets in the database, and may create a case for analysis using engine 745. The metadata may correspond to the data sets in the received or on-boarded database. The metadata determined at step 1025 may be a subset of the metadata associated with the received or on-boarded database. For example, the metadata determined at step 1025 may correspond to properties of the data set that are associated with or applicable to the one or more core capabilities on-boarded at step 1020. Metadata not associated with or applicable to on-boarded core capabilities may not be on-boarded, to improve resource use efficiency by targeting applicable metadata.

At step 1030, the data governance as a service system may apply at least one policy rule to the data governance metadata determined at step 1025. The at least one policy rule may be determined based on the one or more core capabilities and may be applied via engine 745 of FIG. 7. In some embodiments, engine 745 may be configured based on the one or more core capabilities loaded at step 1020. In such embodiments, for example, policy rule engine and alerting module 760 may load one or more machine learning models that correspond to the one or more core capabilities loaded at step 1020. Accordingly, application of the at least one policy rule to the data governance metadata may be based on the one or more core capabilities loaded at step 1020.

In some embodiments, the data governance as a service system may use a trained machine learning model to predict policy violations in the data governance metadata based on one or both of the at least one core capability or the at least one policy rule. The machine learning model may be trained using historical or simulated training data, including a plurality of core capabilities, policy rules, and data governance metadata. The machine learning model may output policy violations based on input data including the data governance metadata determined at step 1025, the one or more core capabilities, and/or the like, by applying the at least one policy rule.

At step 1035, the data governance as a service system may generate a first alert. In some embodiments, the first alert may be generated based on the application of at least one policy rule and a detection of a corresponding violation. In some embodiments, the first alert may be generated automatically upon applying the at least one policy rule to the data governance metadata. The first alert may be an indication that a corresponding violation is identified and may further include a proposed remediation action (e.g., output by engine 745). The first alert may include information including, but not limited to, the corresponding metadata, the corresponding data set, the corresponding policy rule that was violated, the violation type, and/or the violation severity.

Accordingly, an alert may be generated based on the presence of a violation and may include contextual data. Such contextual data may be available to engine 745, data management tools 712, and/or applicable systems (e.g., data risk control team system 610, data governance system 615, and/or data governance oversteer system 620) to facilitate remediation of the violation or perform another action related to the violation. Case management system 742 and/or workflow management system 743 may receive and/or monitor alerts for one or more datasets.

At step 1040, the first alert may be transmitted to a designated system, such as engine 745, data management tools 712, and/or applicable systems (e.g., data risk control team system 610, data governance system 615, and/or data governance oversteer system 620). According to some embodiments, the first alert may also be provided to data owner systems (e.g., Data Producer 705, Data Consumer 710), to Data Steward modules 625, and/or to Data Approval system 630.

Receipt of the alert by one or more systems may trigger a remediation action. The remediation action may be determined by an applicable system (e.g., based on the type of violation). Alternatively, as discussed herein, the alert may include a proposed remediation action to be performed by an applicable system.

At step 1045, the data governance as a service system may receive a response to the first alert from the designated system and/or may review the response to the first alert. As discussed herein, the response may be a successful remediation of the violation. Such a response may result in clearing of the alert and/or violation (e.g., via Case management system 742 and/or workflow management system 743) and/or closing a case associated with the data set. Upon determining to close the case, the data governance as a service system may generate a request to close the case and/or may transmit the request to close the case (e.g., to a system associated with the data governance as a service system). Upon closing a case, corresponding data may be provided to a data user and/or to an applicable server for storage (e.g., at data store platform, application, and/or access management system 780).

As also discussed herein, the response to the first alert may be an unsuccessful remediation of the violation. The data governance as a service system may analyze such a response to the first alert and determine not to close the case. Upon determining not to close the case, the data governance as a service system may generate a second alert. The second alert may include information relating to the status of the resolution and may further include the information and/or data associated with the first alert. The second alert may be transmitted to one or more of data risk control team system 610, data governance system 615, and/or data governance oversteer system 620, which may determine a remediation action or may designate the violation an acceptable violation.

The steps of flowchart 1005 of FIG. 10 may be implemented during a registration process, a maintenance and use process, and/or a remediation process. Rules and/or policies applied to detect violations may be determined based on the given process being applied. The rules and/or policies may be updated based on previous alerts, violations, remediation, and/or other actions associated with the same. These steps may be iterated for the same data set such that these steps may be performed using the same data set at different times (e.g., based on updated rules or policies).

As discussed herein, data governance is a complex process with many moving parts, ranging from data quality, master data management and the challenges presented by encryption, to choosing the right technology tools and the enforcement of policies. An entity may not be set up to perform all required tasks at the same time. Most entities may not have the insight and oversight to establish and maintain good governance, while many others may focus on short-term standalone data projects, rather than the benefits of a long-term, holistic strategy.

As disclosed herein, in order to embrace data governance as a positive route to business improvement and robust regulatory compliance, entities may benefit from the governance as-a-service model to meet the gaps in data governance capabilities, experience and technologies.

DGaaS, as disclosed herein, may bridge the gap between objectives and results. In doing so, it's an approach designed to take the risk away from investments and deliver the strategy and proven technologies required to ensure data governance projects succeed.

Some benefits of standardization are highlighted below.

Improved clarity: a standard process may eliminate the need for guesswork or extra searching and decreases ambiguity and guesswork.

Optimized quality: as work may be done in a pre-defined, optimized manner.

Promotes productivity: systems may be implemented such that entity personnel may not need to seek answers or documentation. Rather, automation and systems disclosed herein may provide information on an as-needed basis.

Boosts morale: conforming to data governance, as disclosed herein, may boost morale based on information that a given entity's data is governed in the manner discussed herein.

Improved customer service: tickets may be handled in accordance with data governance policies for faster and/or streamlined responses.

Experiments

According to an experiment, a metadata collector and feature engine may be used with the governance systems disclosed herein. The following example includes an enterprise to enterprise (e2e) use case for onboarding new data services using the Governance platform. Although this example use case is directed to a Service S3™ ("Service S3") platform, it will be understood that the Service S3 is an example only.

Onboarding Data Service platform: A new data service may be on-boarded using a governance system before it is available for use by a given organization. The governance system may confirm that a new S3 Service supports essential governance features and creates new controls to monitor, access management, data management support for data registration, data lineage, data quality, data security scan, and data privacy.

Governance functionality: Applicable when S3 Service is on boarded on data management tools and available for general availability.

Data Management Metadata collector starts fetching metadata from each data management tool. For example: data catalog (e.g., data sets, data stewards, schema, etc.); data security (e.g., NPI indicator, PCI indicator, sensitive data element, etc.); data quality (e.g., data accuracy, data reliability, etc.).

Policy Rule Engine: the Policy rule engine executes various governance policies run on top of metadata and updates/creates cases.

Portal UI: Persona-based view displays all cases open and predicts remediation steps.

Automated remediation: Automated remediation platform connects with data management tools to perform remediation action on those cases.

Data Management Metadata aggregates metadata tags from Data Management tools For example, for S3, Security (e.g., Data sets, NPI Data, PCI Data, Human Data, etc.) which is the collection phase. During the triage phase, true positive vs. false positive may be identified. If a given metadata corresponds to a false positive, it will be provided to the investigation phase. If no false positive is determined, it will be provided to the case creation phase. Next, cases will be created for each true positive finding and can be reported to a user using a portal.

Accordingly, the subject matter disclosed herein includes: best governance practices and how to implement the same; how to decouple data producers from data governance; how to focus on data governance rather than creating data management tools and binding them together to fulfill governance needs; and how to easily plugin as a service into any entity structure without impacting existing data governance.

As discussed herein, entity level data governance is needed to meet data governance needs. Tech transformation companies are prioritizing data driven strategies as their first competitive imperative and data governance is the backbone of a well-managed data strategies entity. Proper governance embedded into the ecosystem of an entity may help to grow manageable data and to prevent risk.

Next generation data governance, as disclosed herein, addresses at least the following issues: lack of trusted data and not easy to access data; last minute data governance control implementations (e.g., Open Platform Communications (OPC), CCPA, etc.) across entities with heavy and time consuming projects; not having complete visibility on, for example, inventory and growing data or new modernized data; missing single pane view of all data assets with human/HSHD indicators; missing governance for producing data and for consuming data; manual and laborious process data governance controls and missing standardized process to implement new controls; issues with data store selection to new tech teams; and/or being unable to unlock potentials of well managed data and unified data.

It should be understood that embodiments in this disclosure are exemplary only, and that other embodiments may include various combinations of features from other embodiments, as well as additional or fewer features.

Figure 11:
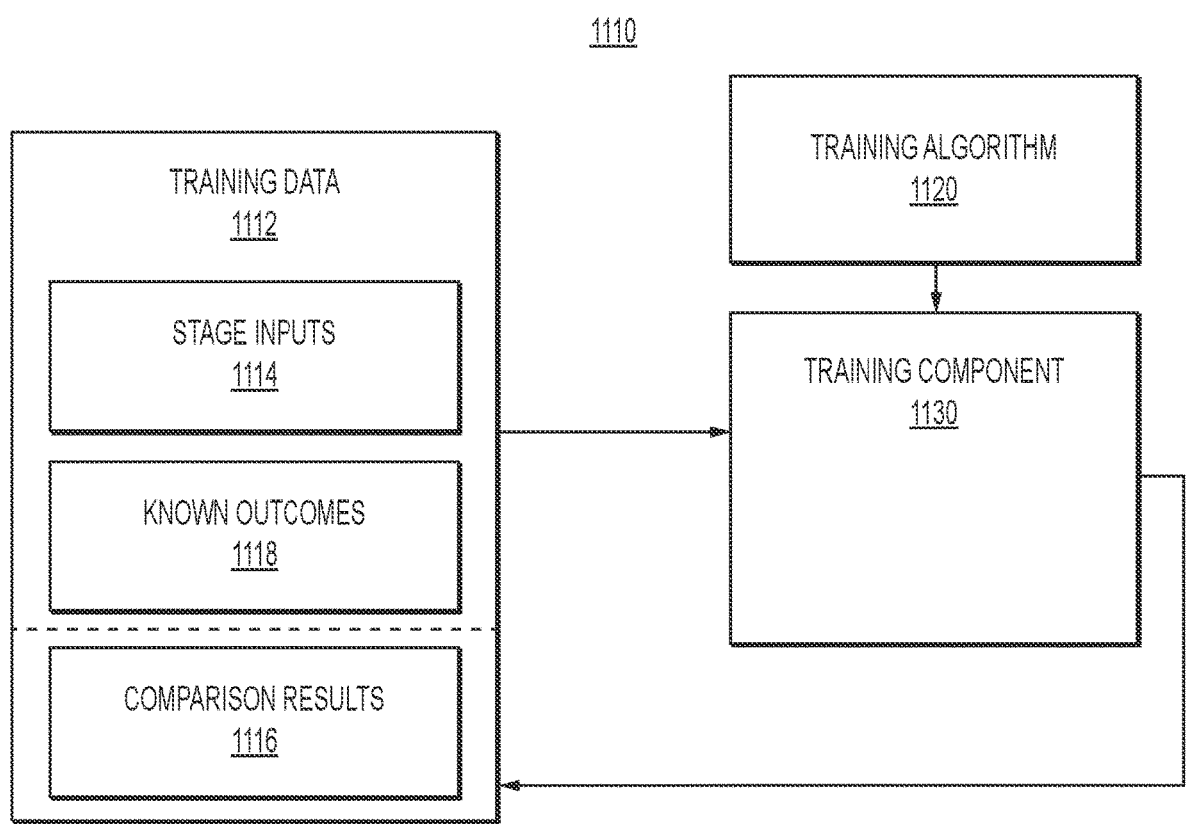
FIG. 11 is an example machine learning training flow chart, according to embodiments of the disclosure.

One or more implementations disclosed herein include and/or are implemented using a machine learning model and/or are used to train the machine learning model. A given machine learning model may be trained using the training flow chart 1100 of FIG. 11. The training data 1112 may include one or more of stage inputs 1114 and the known outcomes 1118 related to the machine learning model to be trained. The stage inputs 1114 are from any applicable source including text, visual representations, data, values, comparisons, and stage outputs. The known outcomes 1118 are included for the machine learning models generated based on supervised or semi-supervised training. An unsupervised machine learning model is not trained using the known outcomes 1118. The known outcomes 1118 includes known or desired outputs for future inputs similar to or in the same category as the stage inputs 1114 that do not have corresponding known outputs.

The training data 1112 and a training algorithm 1120, e.g., one or more of the modules implemented using the machine learning model and/or are used to train the machine learning model, is provided to a training component 1130 that applies the training data 1112 to the training algorithm 1120 to generate the machine learning model. According to an implementation, the training component 1130 is provided with comparison results 1116 that compare a previous output of the corresponding machine learning model to apply the previous result to re-train the machine learning model. The comparison results 1116 are used by the training component 1130 to update the corresponding machine learning model. The training algorithm 1120 utilizes machine learning networks and/or models including, but not limited to a deep learning network such as a transformer, Deep Neural Networks (DNN), Convolutional Neural Networks (CNN), Fully Convolutional Networks (FCN) and Recurrent Neural Networks (RCN), probabilistic models such as Bayesian Networks and Graphical Models, classifiers such as K-Nearest Neighbors, and/or discriminative models such as Decision Forests and maximum margin methods, the model specifically discussed herein, or the like.

The machine learning model used herein is trained and/or used by adjusting one or more weights and/or one or more layers of the machine learning model. For example, during training, a given weight is adjusted (e.g., increased, decreased, removed) based on training data or input data. Similarly, a layer is updated, added, or removed based on training data/and or input data. The resulting outputs are adjusted based on the adjusted weights and/or layers.

Figure 12:
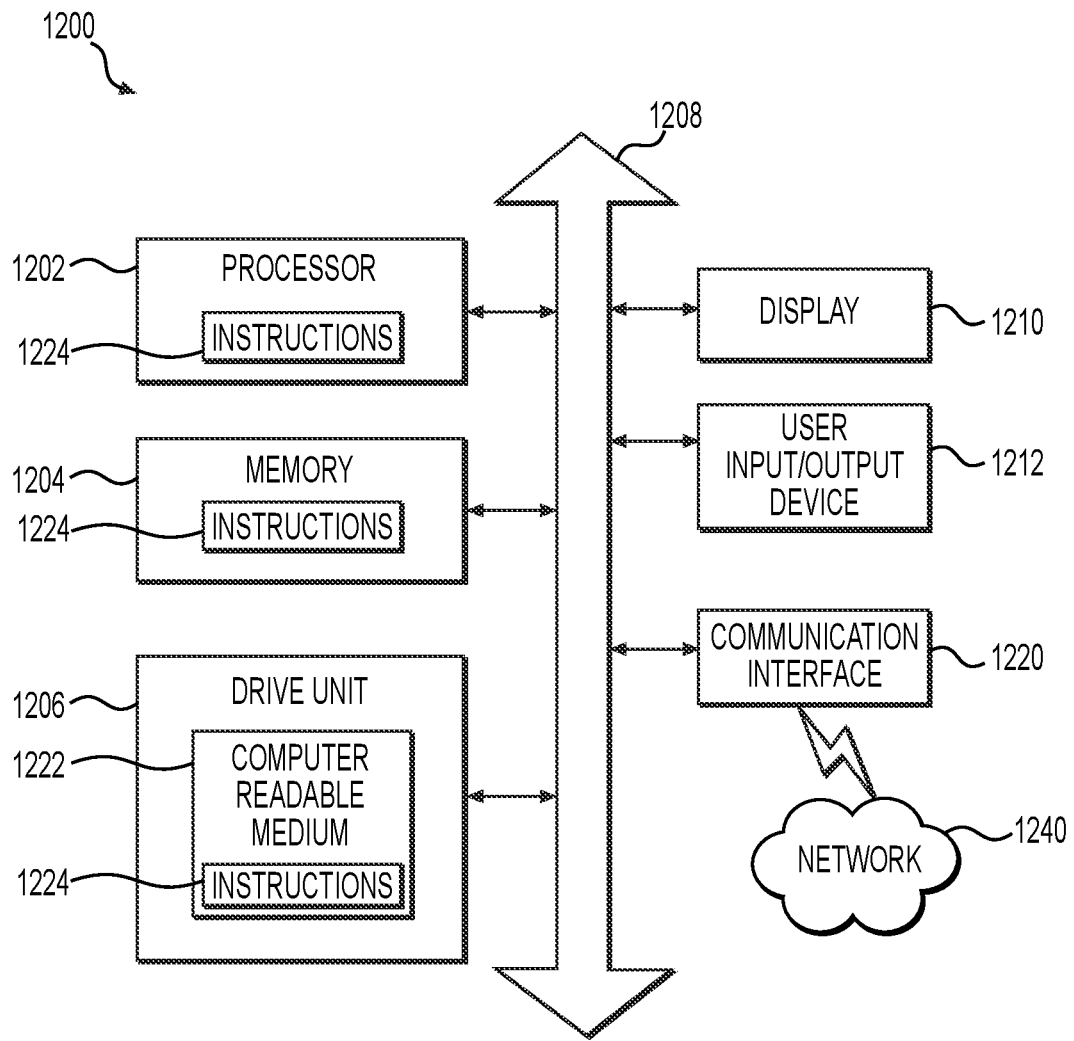
FIG. 12 is a simplified functional block diagram of a computer, according to embodiments of the disclosure.

FIG. 12 depicts a simplified functional block diagram of a computer 1200 that may be configured as a device for executing the methods disclosed here, according to exemplary embodiments of the present disclosure. For example, the computer 1200 may be configured as a system according to exemplary embodiments of this disclosure. In various embodiments, any of the systems herein may be a computer 1200 including, for example, a data communication interface 1220 for packet data communication. The computer 1200 also may include a central processing unit (CPU) 1202, in the form of one or more processors, for executing program instructions. The computer 1200 may include an internal communication bus 1208, and a storage unit 1206 (such as ROM, HDD, SDD, etc.) that may store data on a computer readable medium 1222, although the computer 1200 may receive programming and data via network communications (e.g., via network 1240). The computer 1200 may also have a memory 1204 (such as RAM) storing instructions 1224 for executing techniques presented herein, although the instructions 1224 may be stored temporarily or permanently within other modules of computer 1200 (e.g., processor 502 and/or computer readable medium 1222). The computer 1200 also may include input and output ports 1212 and/or a display 1210 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A method for performing data governance as a service, the method comprising:
    onboarding a database to a governance as a service system, the database comprising at least one data set;
    executing, via the data governance as a service system, at least one core capability, wherein the at least one core capability is applicable to the at least one data set;
    determining data governance metadata for the at least one data set, wherein the data governance metadata is a subset of metadata of the at least one data set, the subset of metadata comprising properties that are associated with the at least one core capability;
    applying at least one policy rule of the core capability to the subset of metadata associated with the at least one core capability;
    determining a violation based on applying the at least one policy rule;
    generating a first alert based on the violation; and
    transmitting the first alert to a designated system.

2. The method of claim 1, wherein the at least one core capability includes definitions of at least one of data security, data lineage, data privacy, data quality, or a data catalog.

3. The method of claim 1, wherein the first alert comprises the governance metadata, the at least one data set, the at least one policy rule, a violation type, or a violation severity.

4. The method of claim 1, further comprising determining whether the at least one core capability is configured to support the determined data governance metadata.

5. The method of claim 1, wherein the violation is output by a trained machine learning model, the trained machine learning model having been trained to predict policy violations based on inputs including the data governance metadata, the at least one core capability, or the at least one policy rule.

6. The method of claim 1, wherein the first alert is automatically generated in response to determining the violation.

7. The method of claim 1, further comprising:
receiving, from the designated system, a response to the first alert; and
based on the response to the first alert, determining a subsequent action.

8. The method of claim 7, wherein the response to the first alert is a remediation of the violation, further comprising at least one of providing the data set to a data user or storing the data set at a storage database.

9. The method of claim 7, wherein the response to the first alert indicates no remediation of the violation, further comprising:
generating a second alert indicating no remediation of the violation, wherein the second alert includes at least a subset of data associated with the first alert; and
transmitting the second alert to a remedial system.

10. A system, the system comprising:
at least one memory storing instructions; and
at least one processor operatively connected to the at least one memory, and configured to execute the instructions to perform operations for data governance as a service, the operations including:
onboarding a database to a governance as a service system, the database comprising at least one data set;
executing, via the data governance as a service system, at least one core capability, wherein the at least one core capability is applicable to the at least one data set;
determining applicable metadata for the at least one data set, wherein the applicable metadata is a subset of metadata of the at least one data set comprising data governance metadata properties that are applicable to the at least one core capability;
applying at least one policy rule of the core capability to the subset of metadata applicable to the at least one core capability;
determining a violation based on applying the at least one policy rule;
generating a first alert based on the violation; and
transmitting the first alert to a designated system.

11. The system of claim 10, wherein the at least one core capability includes definitions of at least one of data security, data lineage, data privacy, data quality, or a data catalog.

12. The system of claim 10, wherein the first alert comprises the governance metadata, the at least one data set, the at least one policy rule, a violation type, or a violation severity.

13. The system of claim 10, wherein the violation is output by a trained machine learning model, the trained machine learning model having been trained to predict policy violations based on inputs including the data governance metadata, the at least one core capability, or the at least one policy rule.

14. The system of claim 10, wherein the operations further comprise:
receiving, from the designated system, a response to the first alert; and
based on the response to the first alert, determining a subsequent action.

15. The system of claim 14, wherein the response to the first alert is a remediation of the violation, and wherein the operations further comprise at least one of providing the data set to a data user or storing the data set at a storage database.

16. The system of claim 14, wherein the response to the first alert indicates no remediation of the violation, and wherein the operations further comprise:
generating a second alert indicating no remediation of the violation, wherein the second alert includes at least a subset of data associated with the first alert; and
transmitting the second alert to a remedial system.

17. A non-transitory computer readable medium configured to store processor-readable instructions, wherein when executed by a processor, the instructions perform operations comprising:
onboarding a database to a governance as a service system, the database comprising at least one data set;
executing, via the data governance as a service system, at least one core capability, wherein the at least one core capability is applicable to the at least one data set;
determining data governance metadata for the at least one data set, wherein the data governance metadata is a subset of metadata of the at least one data set, the subset of metadata comprising properties that are associated with or applicable to the at least one core capability;
applying at least one policy rule of the core capability to the subset of metadata associated with or applicable to the at least one core capability;
determining a violation based on applying the at least one policy rule;
generating a first alert based on the violation; and
transmitting the first alert to a designated system.

18. The non-transitory computer readable medium of claim 17, wherein the at least one core capability includes definitions of at least one of data security, data lineage, data privacy, data quality, or a data catalog.

19. The non-transitory computer readable medium of claim 17, wherein the first alert comprises the governance metadata, the at least one data set, the at least one policy rule, a violation type, or a violation severity.

20. The non-transitory computer readable medium of claim 17, further comprising determining whether the at least one core capability is configured to support the determined data governance metadata.

* * * * *